(12) United States Patent
Ozaki

(10) Patent No.: US 7,055,017 B2
(45) Date of Patent: May 30, 2006

(54) OPTICAL DISK DRIVE, METHOD FOR FORMATTING OPTICAL DISK, AND OPTICAL DISK

(75) Inventor: Koji Ozaki, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 10/281,802

(22) Filed: Oct. 28, 2002

(65) Prior Publication Data
US 2003/0048731 A1 Mar. 13, 2003

Related U.S. Application Data

(63) Continuation of application No. PCT/JP00/04915, filed on Jul. 21, 2000, now abandoned.

(51) Int. Cl.
*G06F 12/00* (2006.01)
(52) U.S. Cl. ............................ 711/220; 711/4; 711/111; 711/221; 714/48; 365/201; 369/275.3
(58) Field of Classification Search ................ 711/220, 711/221, 4, 111; 714/48; 365/201; 369/275.3
See application file for complete search history.

(56) References Cited

U.S. PATENT DOCUMENTS

| | | | | |
|---|---|---|---|---|
| 5,235,585 | A * | 8/1993 | Bish et al. ............... | 369/53.17 |
| 5,293,565 | A * | 3/1994 | Jaquette et al. .......... | 369/275.3 |
| 5,303,219 | A * | 4/1994 | Kulakowski et al. ..... | 369/53.17 |
| 5,319,626 | A * | 6/1994 | Ozaki et al. ............. | 369/53.17 |
| 5,319,627 | A * | 6/1994 | Shinno et al. ........... | 369/53.17 |
| 5,404,357 | A * | 4/1995 | Ito et al. .................. | 714/719 |
| 5,761,160 | A | 6/1998 | Sanada ..................... | 369/32 |
| 5,883,867 | A * | 3/1999 | Yamamuro ................ | 369/47.14 |
| 6,103,407 | A * | 8/2000 | Izumi et al. ........ | 428/694 ML |
| 6,201,784 | B1 * | 3/2001 | Maeda ..................... | 369/59.25 |
| 6,298,033 | B1 * | 10/2001 | Tanoue et al. ........... | 369/275.3 |
| 6,301,644 | B1 * | 10/2001 | Andoh et al. ............... | 711/201 |
| 6,418,111 | B1 * | 7/2002 | Takemura et al. ....... | 369/275.3 |
| 6,442,715 | B1 * | 8/2002 | Wilson ...................... | 714/710 |
| 6,469,978 | B1 * | 10/2002 | Ohata et al. ............. | 369/275.3 |
| 6,470,412 | B1 * | 10/2002 | Kisaka et al. .................. | 711/4 |

(Continued)

FOREIGN PATENT DOCUMENTS

JP  63-224076  9/1988

(Continued)

OTHER PUBLICATIONS

Williams, "An Overview of Optical Disk Standards," pp 134-136, IEEE, Apr. 1994.*

(Continued)

*Primary Examiner*—Stephen C. Elmore
(74) *Attorney, Agent, or Firm*—Greer, Burns & Crain, Ltd.

(57) ABSTRACT

An optical disk drive for initializing an optical disk by dividing a recording area into zones and by assigning logical addresses to each of the zones. The disk drive includes a medium management table for providing rewritable assignment order data describing an order in which the respective zones receive logical addresses, a formatter for performing the initialization of the optical disk while assigning logical addresses to one of the zones after another in accordance with the assignment order data, and an address assignment order changer. The changer changes the logical address assignment order with respect to the zones, rewrites the current assignment order data in the medium management table in accordance with the changed logical address assignment order, and writes the rewritten assignment order data to the optical disk.

14 Claims, 18 Drawing Sheets

U.S. PATENT DOCUMENTS

| | | | |
|---|---|---|---|
| 6,615,363 B1 * | 9/2003 | Fukasawa | 714/5 |
| 6,631,106 B1 * | 10/2003 | Numata et al. | 369/53.17 |
| 6,725,400 B1 * | 4/2004 | Ko | 714/42 |
| 6,747,929 B1 * | 6/2004 | Ko et al. | 369/53.17 |

FOREIGN PATENT DOCUMENTS

| | | |
|---|---|---|
| JP | 4-006673 | 1/1992 |
| JP | 6-150564 | 5/1994 |
| JP | 7-192409 | 7/1995 |
| JP | 8-063896 | 3/1996 |
| JP | 8-249824 | 9/1996 |
| JP | 11-213567 | 8/1999 |
| JP | 11-297006 | 10/1999 |

OTHER PUBLICATIONS

Van Vlerken et al., "Format Detection for DVD+ReWritable 4.7 GB," pp 162-163, IEEE, Jun. 2000.*

* cited by examiner

FIG. 3

DDS

| Byte No. | Description | |
|---|---|---|
| 0 | DDS Identifier | (0A) |
| 1 | DDS Identifier | (0A) |
| 2 | Media Identifier | (00) |
| 3 | Disk has been certified | (01) |
|   | Disk has not been certified | (02) |
| 4 | Number of groups MSB | (13) |
| 5 | Number of groups LSB | (00) |
| 6~13 | Reserved | -- |
| 14 | Start Address of PDL, Track MSB | -- |
| 15 | Start Address of PDL | -- |
| 16 | Start Address of PDL, Track LSB | -- |
| 17 | Start Address of PDL, Sector | -- |
| 18 | Start Address of SDL, Track MSB | -- |
| 19 | Start Address of SDL | -- |
| 20 | Start Address of SDL, Track LSB | -- |
| 21 | Start Address of SDL, Sector | (01) |
| 22 | Groups 0 Type | (01) |
| 23 | Groups 1 Type | (01) |
| 24 | Groups 2 Type | (01) |
| 25 | Groups 3 Type | (01) |
| 26 | Groups 4 Type | (01) |
| 27 | Groups 5 Type | (01) |
| 28 | Groups 6 Type | (01) |
| 29 | Groups 7 Type | (01) |
| 30 | Groups 8 Type | (01) |
| 31 | Groups 9 Type | (01) |
| 32 | Groups 10 Type | (01) |
| 33 | Groups 11 Type | (01) |
| 34 | Groups 12 Type | (01) |
| 35 | Groups 13 Type | (01) |
| 36 | Groups 14 Type | (01) |
| 37 | Groups 15 Type | (01) |
| 38 | Groups 16 Type | (01) |
| 39 | Groups 17 Type | (01) |
| 40 | Order of Logical Addresses for Zone 0 | -- |
| 41 | Order of Logical Addresses for Zone 1 | -- |
| 42 | Order of Logical Addresses for Zone 2 | -- |
| 43 | Order of Logical Addresses for Zone 3 | -- |
| 44 | Order of Logical Addresses for Zone 4 | -- |
| 45 | Order of Logical Addresses for Zone 5 | -- |
| 46 | Order of Logical Addresses for Zone 6 | -- |
| 47 | Order of Logical Addresses for Zone 7 | -- |
| 48 | Order of Logical Addresses for Zone 8 | -- |
| 49 | Order of Logical Addresses for Zone 9 | -- |
| 50 | Order of Logical Addresses for Zone 10 | -- |
| 51 | Order of Logical Addresses for Zone 11 | -- |
| 52 | Order of Logical Addresses for Zone 12 | -- |
| 53 | Order of Logical Addresses for Zone 13 | -- |
| 54 | Order of Logical Addresses for Zone 14 | -- |
| 55 | Order of Logical Addresses for Zone 15 | -- |
| 56 | Order of Logical Addresses for Zone 16 | -- |
| 57 | Order of Logical Addresses for Zone 17 | -- |
| 58~2047 | Reserved | (00) |

 Assignment Order Data

FIG. 5

Medium Management Table

| Medium Type | Radial Distance From Disk Center | Zone No. 0~ | Order of Logical Address 1~ | First through Last Addresses in Zone (Track/Sector) | Record/Play Frequency | Sectors per Track | Sectors per Zone | Spare Sectors per Zone | Max. Defective Sectors per Disk |
|---|---|---|---|---|---|---|---|---|---|
| 1.3 GB | 41.00mm Most Outward | 0 | 1 | 3/0 ~ 2557/16 | 71.00MHz | 41 | 43435 | 323 | 4437 |
| | ... | 1 | 2 | .... | .. | .. | ... | ... | |
| | ... | 2 | 3 | .... | .. | .. | ... | ... | |
| | 24.61mm Most Inward | 17 | 18 | 35366/0 ~ 36811/16 | 41.56MHz | 24 | 24582 | 170 | |
| 640 MB | 39.43mm Most Outward | 10 | 11 | 5/0 ~ 1253/16 | 38.76MHz | 25 | 35547 | 204 | 4437 |
| | ... | 9 | 10 | .... | .. | .. | ... | ... | |
| | ... | 8 | 9 | .... | .. | .. | ... | ... | |
| | 23.72mm Most Inward | 0 | 1 | 16382/0 ~ 18472/16 | 23.26MHz | 15 | 21233 | 204 | |
| | ... | .. | .. | .... | .. | .. | ... | ... | |
| | ... | .. | .. | .... | .. | .. | ... | ... | |
| .. | ... | .. | .. | .... | .. | .. | ... | ... | .. |
| | ... | .. | .. | .... | .. | .. | ... | ... | |

Assignment Order Data

FIG. 17
(PRIOR ART)

DDS

| Byte No. | Description | |
|---|---|---|
| 0 | DDS Identifier | (0A) |
| 1 | DDS Identifier | (0A) |
| 2 | Media Identifier | (00) |
| 3 | Disk has been certified | (01) |
|   | Disk has not been certified | (02) |
| 4 | Number of groups MSB | (00) |
| 5 | Number of groups LSB | (13) |
| 6~13 | Reserved | (00) |
| 14 | Start Address of PDL, Track MSB | -- |
| 15 | Start Address of PDL | -- |
| 16 | Start Address of PDL, Track LSB | -- |
| 17 | Start Address of PDL, Sector | -- |
| 18 | Start Address of SDL, Track MSB | -- |
| 19 | Start Address of SDL | -- |
| 20 | Start Address of SDL, Track LSB | -- |
| 21 | Start Address of SDL, Sector | -- |
| 22 | Groups 0 Type | (01) |
| 23 | Groups 1 Type | (01) |
| 24 | Groups 2 Type | (01) |
| 25 | Groups 3 Type | (01) |
| 26 | Groups 4 Type | (01) |
| 27 | Groups 5 Type | (01) |
| 28 | Groups 6 Type | (01) |
| 29 | Groups 7 Type | (01) |
| 30 | Groups 8 Type | (01) |
| 31 | Groups 9 Type | (01) |
| 32 | Groups 10 Type | (01) |
| 33 | Groups 11 Type | (01) |
| 34 | Groups 12 Type | (01) |
| 35 | Groups 13 Type | (01) |
| 36 | Groups 14 Type | (01) |
| 37 | Groups 15 Type | (01) |
| 38 | Groups 16 Type | (01) |
| 39 | Groups 17 Type | (01) |
| 40~2047 | Reserved | (00) |

OPTICAL DISK DRIVE, METHOD FOR FORMATTING OPTICAL DISK, AND OPTICAL DISK

CROSS REFERENCE TO RELATED APPLICATION

This is a continuation of International Application No. PCT/JP00/04915 filed Jul. 21, 2000, now abandoned.

TECHNICAL FIELD

The present invention relates to an optical disk drive for physically formatting e.g. magneto-optical disks, a method for formatting an optical disks, and the optical disk as the object of the physical formatting.

BACKGROUND ART

As shown in FIG. 15, a conventional magneto-optical disk A includes a multiple of lands and grooves for recording data. The lands and grooves are conceptually divided circumferentially of the disk at a predetermined angle into a number of address-assignable sectors. Further, the magneto-optical disk A is conceptually divided by physical formatting into zones each including a series of sectors. The number of zones depends on the capacity and kind of the magneto-optical disk. For example, the magneto-optical disk of a 640 MB capacity is divided into eleven zones, whereas the magneto-optical disk of a 1.3 GB capacity is divided into eighteen zones as shown in FIG. 16. The lands, grooves and sectors are not illustrated in the accompanying drawings. In practical application the lands and grooves often have a spiral form.

Each of the zones in the magneto-optical disk A is given logical addresses at the time of physical formatting. The logical addresses are assigned in order from the radially inward through the outward side or the other way round, i.e. from the radially outward through the inward side, of the magneto-optical disk A according to industrial standards. For example, in the magneto-optical disks of 230 MB, 540 MB and 640 MB capacities, the logical addresses are assigned from the radially most inward zone through the most outward zone. On the other hand, in the magneto-optical disks of 1.3 GB capacity, as shown in FIG. 16, the logical addresses are assigned from the radially most outward zone through the most inward zone. As described, the order in which the logical address assignment is made is an industrial standard set forth for each kind and capacity of the magneto-optical disks, and therefore cannot be altered arbitrarily.

Next, description will be made for a series of procedures executed when a command is received from a host C for writing data onto a magneto-optical disk A. When loaded with a magneto-optical disk A, the recorder/player B in FIG. 15 calls up a medium type identifier 100 to read medium management information A1 which is pre-recorded on the magneto-optical disk A, and identifies the type of the disk.

An address converter 110 makes reference to a medium management table 120, reads data about the order of logical address assignment which is the standard set forth for each type of the disks, and based on this data obtains the order of the logical address for each zone. For example, if the magneto-optical disk is of the 230 MB, 540 MB or 640 MB capacity, the address converter 110 recognizes that the logical addresses are assigned from the radially most inward zone through the most outward zone. On the other hand, if the magneto-optical disk is of the 1.3 GB capacity, the address converter 110 recognizes that the logical addresses are assigned from the radially most outward zone through the most inward zone.

Further, the address converter 110, upon reception of logical addresses specified by the host C, makes reference to the medium management table 120, reads data about the number of sectors in each zone which is a standard set forth for each type of the disks, and obtains preliminary physical addresses based on the read data. These preliminary physical addresses will be formal addresses if there is no defective sector found in any zones of the magneto-optical disk A, or if defective sectors are found to have no influence on the address assignment during the obtainment of the physical addresses. The address converter 110 makes reference to PDL (Primary Defect List, to be described later) and SDL (Secondary Defect List, to be described later) contained in the medium management information A1, and checks if there will be an influence on the preliminary physical addresses.

Here, comparison is made between FIG. 18 and FIG. 19: when a defective sector is detected in a zone during the physical formatting of a magneto-optical disk A, the defective sector is skipped by the step of writing initializing data, and this zone which includes the defective sector is extended into a spare zone in order to provide a predetermined number of flawless sectors by using a spare sector available in the spare zone. The physical address of the defective sector is recorded in the medium management information A1 for management of the medium. Such a defect, i.e. a defect in which a logical address can be assigned while skipping defective sectors, is referred to as a primary defect. A set of addresses of the defective sectors that fall into the category of the primary defect is called PDL.

On the other hand, compare FIG. 18 and FIG. 20: when a defective sector is detected in a zone while writing data, the data is written onto another sector in the spare zone, in place of the defective sector. Then, the physical address of the defective sector and the physical address of the spare sector which replaced the defective sector are recorded onto the medium management information A1 for the sake of address conversion. Such a defect, i.e. a defect in which a replacing spare sector can be specified by address conversion, is called secondary defect. A set of addresses of the defective sectors that fall into the category of the secondary defect is called SDL.

Specifically, when a magneto-optical disk A includes primary defects, the address converter 110 makes reference to the PDL, shifts a given address according to the number of the primary defects, and thereby obtain a correct physical address. On the other hand, when there are secondary defects, and their preliminary physical addresses are included in the SDL, the address converter 110 makes reference to the SDL, and thereby obtain physical addresses of replacing sectors. Thus, the address converter 110 converts logical addresses given by the host C into correct physical addresses.

With the above, data sent from the host C together with specifying addresses are temporarily stored in an unillustrated data buffer provided in the recorder/player B. A data reading/writing section 140 writes the data according to the physical addresses obtained by the address converter 110. When the writing of data is complete, the data reading/writing section 140 reports the completion of the operation to the host C. Such data writing is performed for the number of blocks specified by the host C.

Next, description will be made about access to a magneto-optical disk A. Generally, the host C, operating on the basis of an OS (Operating System) which provides file managing capabilities, controls the location of files stored on the magneto-optical disk A via the recorder/player B. For this purpose, file management information A2 which indicates file location is stored at a head portion of the zones assigned with logical addresses on the magneto-optical disk A. Whenever a file is read, made, updated or deleted on the magneto-optical disk A, reference is made to the file management information A2 and the information is updated. Therefore, the head portion of the zones on the magneto-optical disk A is the area that is accessed most frequently.

When files are added to the magneto-optical disk A, writing of file data is made in an ascending order of logical addresses, i.e. from a zone having relatively small logical addresses through a zone having relatively large logical addresses. For example, in magneto-optical disks of the 230 MB, 540 MB and 640 MB capacities, the logical address assignment is made from the radially most inward zone through the most outward zone, and thus the file data is written from the inward toward the outward side. On the contrary, in magneto-optical disks of the 1.3 GB capacity, as shown in FIG. 16, the logical address is assigned from the radially most outward zone through the most inward zone, and thus the file data is written from the outward to the inward side.

As will be understood, in a magneto-optical disk A, it is very rare that each zone is accessed equally, and it is very usual that access is concentrated on zones having the smallest logical addresses, in reading/writing of data.

Next, description will be made about an operation for physically formatting a magneto-optical disk A. When loaded with a magneto-optical disk A, the recorder/player B calls up the medium type identifier 100 to read medium management information A1 which is pre-recorded on the magneto-optical disk A, and identifies the type of the disk. When the physical formatting is requested from the host C to the recorder/player B, the address converter 110 makes reference to the medium management table 120, reads data about the order of logical address assignment which is a standard set forth for each type of the disks, as well as the first and the last physical addresses for each zone based on the read data, and obtains a physical address for each zone.

A physical formatter 130 writes initializing data, within the range from the first through the last addresses obtained for each zone, in the order from a zone having the smallest logical address through a zone having the largest logical address. When there is a failure in writing the initializing data, a recovery section 150 makes are try regarding the writing of the initializing data until a predetermined number of retries is reached. If the writing is not successful within the predetermined number of retries, this sector is treated as defective, and the physical address of the defective sector is tentatively stored in the form of PDL in a memory 160. This formatting procedure is executed to all sectors in all zones which are to be initialized.

When the number of defective sectors detected during the formatting procedure has exceeded a predetermined limit, the physical formatter 130 cancels the formatting procedure and reports a disk error to the host C. On the other hand, when the number of defective sectors did not exceed the limit, the physical formatter 130 copies the PDL, which has been stored in the memory 160 during the formatting, onto the medium management information A1 on the magneto-optical disk A, and reports a successful completion of the formatting to the host C. The above is a conventional physical formatting procedure.

Now, consider a case in which the host C sends a data writing command accompanied with address specification in the form of logical address. The address converter 110 converts the given logical address into a physical address, obtains physical addresses of the first and the last sectors onto which the data is to be written, and further, checks if there is any defective sectors within the range specified by the addresses. If there is no defective sector within the range, each of necessary steps such as erasing/writing/verifying procedures is performed one time to every sector, continuously from the first to the last sectors specified by the addresses for the data writing.

However, if there are defective sectors within the specified range, the data writing must be made while skipping these defective sectors. Therefore, the erasing/writing/verifying procedures are repeated as many times as the number of regions fragmented by the defected sectors. In other words, each of the erasing/writing/verifying procedures is performed to the plurality of regions, at a cost of idling rotations of the magneto-optical disk A, resulting in a prolonged data writing time.

Likewise, consider a case in which the host C sends a data reading command accompanied with address specification in the form of logical address. The address converter 110 converts the given logical address into a physical address, obtains physical addresses of the first and the last sectors from which the data is to be read, and further, checks if there is any defective sectors within the range specified by the addresses. If there is no defective sector within the range, a reading procedures is performed one time, continuously from the first to the last sectors specified by the addresses for the data reading.

However, if there are defective sectors within the specified range, the data reading must be made while skipping these defective sectors. Therefore, the reading procedure is repeated as many times as the number of regions fragmented by the defected sectors. In other words, the reading procedure is performed to the plurality of regions, at a cost of idling rotations of the magneto-optical disk A, resulting in a prolonged data reading time.

With the above, as described earlier, there is the file management information A2 at a zone that has the smallest logical address, and whenever a file is read or written, reference is made to the file management information A2 and the information is updated. Therefore, access is concentrated on the zone having the smallest logical address. If this zone contains many defective sectors, a long time must be spent for updating the file management information A2 every time the host C requests file writing or reading, and this results in delayed response to the host C.

There is another problem: whenever a file is accessed for reading or writing, the address converter 110 searches the PDL and the SDL in the medium management information A1 in order to convert logical addresses specified by the host C into physical addresses. This search is executed on the basis of an unillustrated control program stored in the recorder/player B. The PDL lists a number of sectors for which address shifting is necessary, whereas the SDL contains physical addresses of replacement sectors. Obviously therefore, a long time must be spent for the search if there are many defective sectors, since the PDL and the SDL contain many addresses.

The prolonged search time spent by the control program results in extra waiting time due to disk idling rotations. Especially, according to a recent recorder/player B which features a high-speed disk rotation, an amount of time necessary for the disk to make a single turn is shorter than an amount of time necessary for searching the PDL or the SDL. As a result, performance decrease is apparent when using the recorder/player B.

There is still another problem. Specifically, when the host C requests the recorder/player B to read or write data, and if there is a failure in the reading/writing, the recovery section 150 performs a retry with regard to the data reading/writing. When this retry is successful and therefore the reading/writing is completed, as compared to a case where there is no failure in the procedure, the amount of time needed for the procedure is longer by the amount of time spent for the retry procedure. Due to increased capacity, magneto-optical disks A in recent years have an increasingly narrow track pitch. This has increased probability of executing the retry procedure and there is a tendency that the number of retries is increasing. As a result, the amount of time spent for the retries and the number of retries have a significant influence on the performance of the recorder/player B.

As described, it is known that the zone having the smallest logical address is accessed very frequently since it includes the file management information A2. A large number of retries performed in this zone poses a problem of delayed response to the host C after the host C sends a writing command or a reading command.

Further, in a magneto-optical disk A in which logical addresses are assigned alternately to the land and the groove, there is usually no problem in reading/writing data whether the first logical address is given to a land or a groove. However, according to the conventional magneto-optical disk A, the zone having the smallest logical address is unchangeably fixed to either one of the land and the groove.

Assume a situation, for example, in which there are more defective sectors in the lands than in the grooves. If it is possible to change so that logical address assignment is started from the grooves, then it becomes possible to speed up access during the referencing and updating of the file management information A2. However, if the zone which has the smallest logical address is unchangeably provided by the lands due to the standard, it has not been possible to improve on the access time by reducing access time for the referencing and updating of the file management information A2.

In addition, although the magneto-optical disk A tends to have a larger capacity, it can be said that users rarely use up all of the capacity, and in great majority of cases only a portion of the entire capacity is used. Even under such a situation where use of the capacity by the users is limited, the current physical formatting procedure provides formatting for the entire capacity. This has created a problem that, for example, as long as 18 minutes have to be spent for physically formatting a 1.3 GB magneto-optical disk for its entire capacity, resulting in an inconvenience to the users.

DISCLOSURE OF THE INVENTION

It is therefore an object of the present invention to provide an optical disk drive, a method for formatting an optical disk, and the optical disk, capable of allowing more efficient access to the optical disk as well as improving on convenience of use.

According to a first aspect of the present invention, there is provided an optical disk drive for initializing an optical disk by dividing a recording area into zones and by assigning logical addresses to each of the zones. The disk drive comprises: a medium management table for providing rewritable assignment order data describing an order in which the respective zones receive logical addresses; a formatter for performing the initialization of the optical disk while assigning logical addresses to one of the zones after another in accordance with the assignment order data; and an address assignment order changer for changing a logical address assignment order with respect to at least part of the zones, for rewriting a current assignment order data in the medium management table in accordance with the changed logical address assignment order, and for writing the rewritten assignment order data to the optical disk.

Preferably, the address assignment order changer changes the logical address assignment order in accordance with a situation of the initialization performed by the formatter.

Preferably, the changing of the logical address assignment order is performed in accordance with an instruction from a host computer.

Preferably, the formatter detects a defective sector in each of the zones when initializing the zone, while the address assignment order changer changes the logical address assignment order in accordance with the number of defective sectors found in the respective zones.

Preferably, the address assignment order changer assigns no logical address to a zone in which the number of defective sectors found by the formatter is greater than a predetermined threshold. This threshold may be set by an instruction from a host computer.

Preferably, the formatter counts the number of retrials for initializing each of the zones, while the address assignment order changer changes the logical address assignment order in accordance with the number of retrials with respect to the respective zones.

Preferably, the address assignment order changer provides no logical address to a zone for which the number of retrials for initialization is greater than a predetermined threshold. This threshold may be set by an instruction from a host computer.

According to a second aspect of the present invention, there is provided a method of formatting an optical disk by dividing a recording area into zones and by assigning logical addresses to each of the zones. The method comprises the steps of: causing a medium management table to provide rewritable assignment order data describing an order in which the respective zones receive logical addresses; performing the initialization of the optical disk while assigning logical addresses to one of the zones after another in accordance with the assignment order data; and changing a logical address assignment order with respect to at least part of the zones, wherein a current assignment order data in the medium management table is rewritten in accordance with the changed logical address assignment order, the rewritten assignment order data being written to the optical disk.

Preferably, the logical address assignment order is changed in accordance with a situation of the initialization of the optical disk.

Preferably, the logical address assignment order is changed in accordance with an instruction from a host computer.

Preferably, in the initialization of the optical disk, each of the zones is subjected to detection of a defective sector. The changing of the logical address assignment order is performed in accordance with the number of defective sectors found in the respective zones.

Preferably, in the initialization of the optical disk, the number of retrials for initializing each of the zones is counted. The logical address assignment order is changed in accordance with the number of retrials with respect to the respective zones.

According to a third aspect of the present invention, there is provided an optical disk comprising: a primary recording region divided into a plurality of zones; and an additional recording region for storing rewritable assignment order data describing an order in which the respective zones receive logical addresses.

Preferably, the assignment order data is rewritten in accordance with a situation of initialization of the primary recording region.

Preferably, the assignment order data is partially rewritten only for selected zones.

Preferably, the assignment order data is rewritten in accordance with the number of defective sectors found in the respective zones.

Preferably, the assignment order data is rewritten in accordance with the number of retrials required for initializing the respective zones.

Other objects, characteristics, and advantages of the present invention will become clearer from the following description of embodiments to be presented with reference to the accompanying drawings.

BRIEF DESCRIPTION OF THE DRAWINGS

FIG. 3 is a diagram showing a DDS (Disk Definition Structure) in FIG. 2.

FIG. 5 is a diagram showing a structure of a medium management table.

FIG. 17 is a diagram showing a DDS in FIG. 16.

BEST MODE FOR CARRYING OUT THE INVENTION

Hereinafter, a first embodiment of the present invention will be described with reference to FIG. 1 through FIG. 8.

Figure 1:
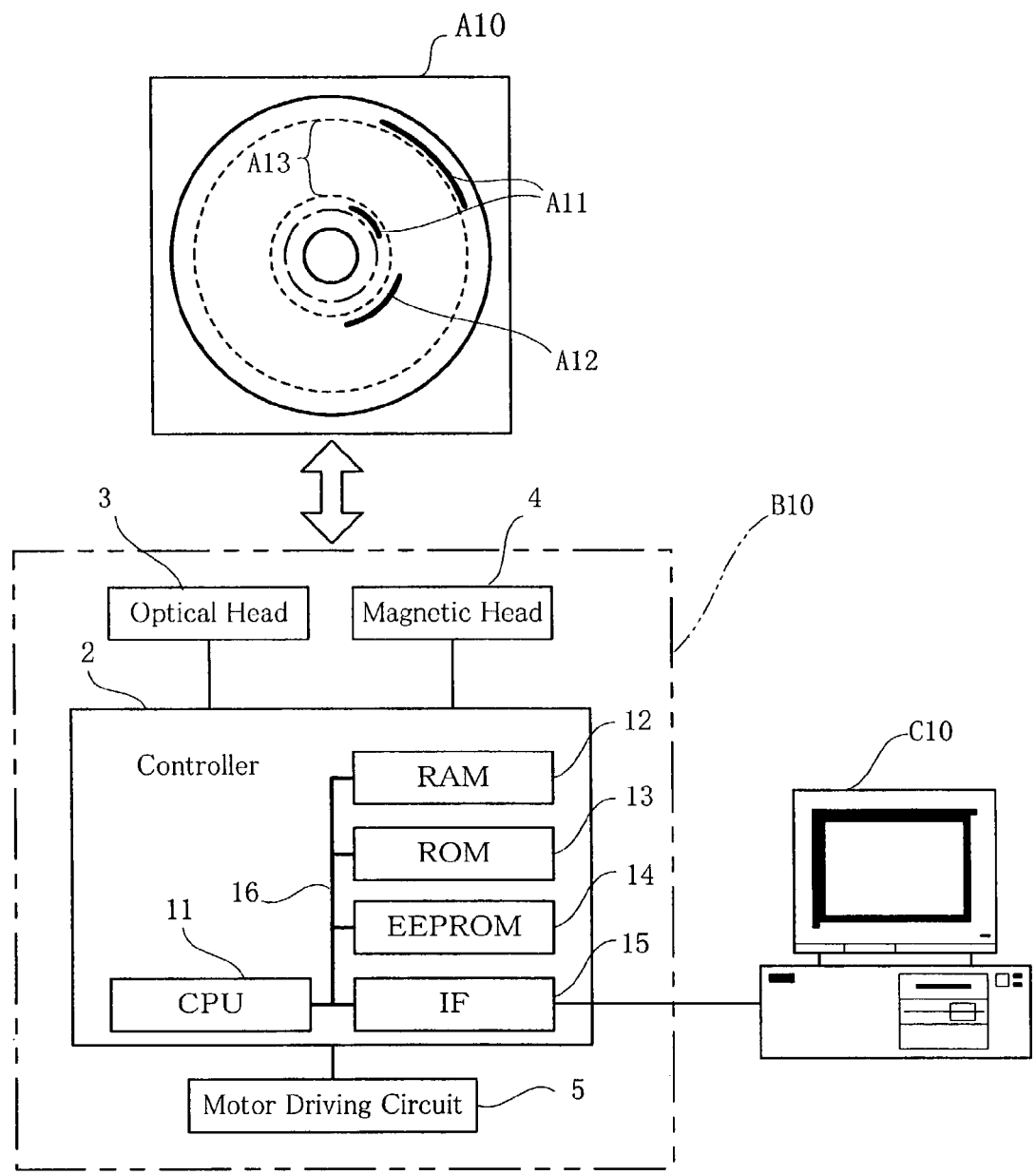
FIG. 1 is a block diagram illustrating a first embodiment of the present invention.

As shown in FIG. 1, the first embodiment of the present invention uses a magneto-optical disk A10 as the optical disk, a recorder/player B10 as the optical disk drive, and a personal computer C10 as a host which directs formatting as well as reading/writing of data. The personal computer C10, operating conventionally on the basis of an OS (Operating System) which provides file managing capabilities, does not have any new essential characteristics, and therefore will not be described or illustrated in specific details.

The magneto-optical disk A10 is provided by e.g. MO disks, of different capacities such as 230 MB, 540 MB, 640 MB, and 1.3 GB. The magneto-optical disk A10 has no physical differences from conventional ones, and includes a multiple of lands and grooves (not illustrated) serving as a recording area A13 for storing data. Conceptually, the magneto-optical disk A10 has a number of sectors each made up of a fragmented division of the land or groove. The lands and the grooves are grouped into zones each including a series of sectors, by the physical formatting to be described later. Generally, in a 640 MB magneto-optical disk for example, the entire recording area is divided into eleven zones. In a 1.3 GB magneto-optical disk, the entire recording area is divided into eighteen zones. The zones include a different number of sectors. Alternatively however, the zones may be so made as to include the same number of sectors.

Figure 2:
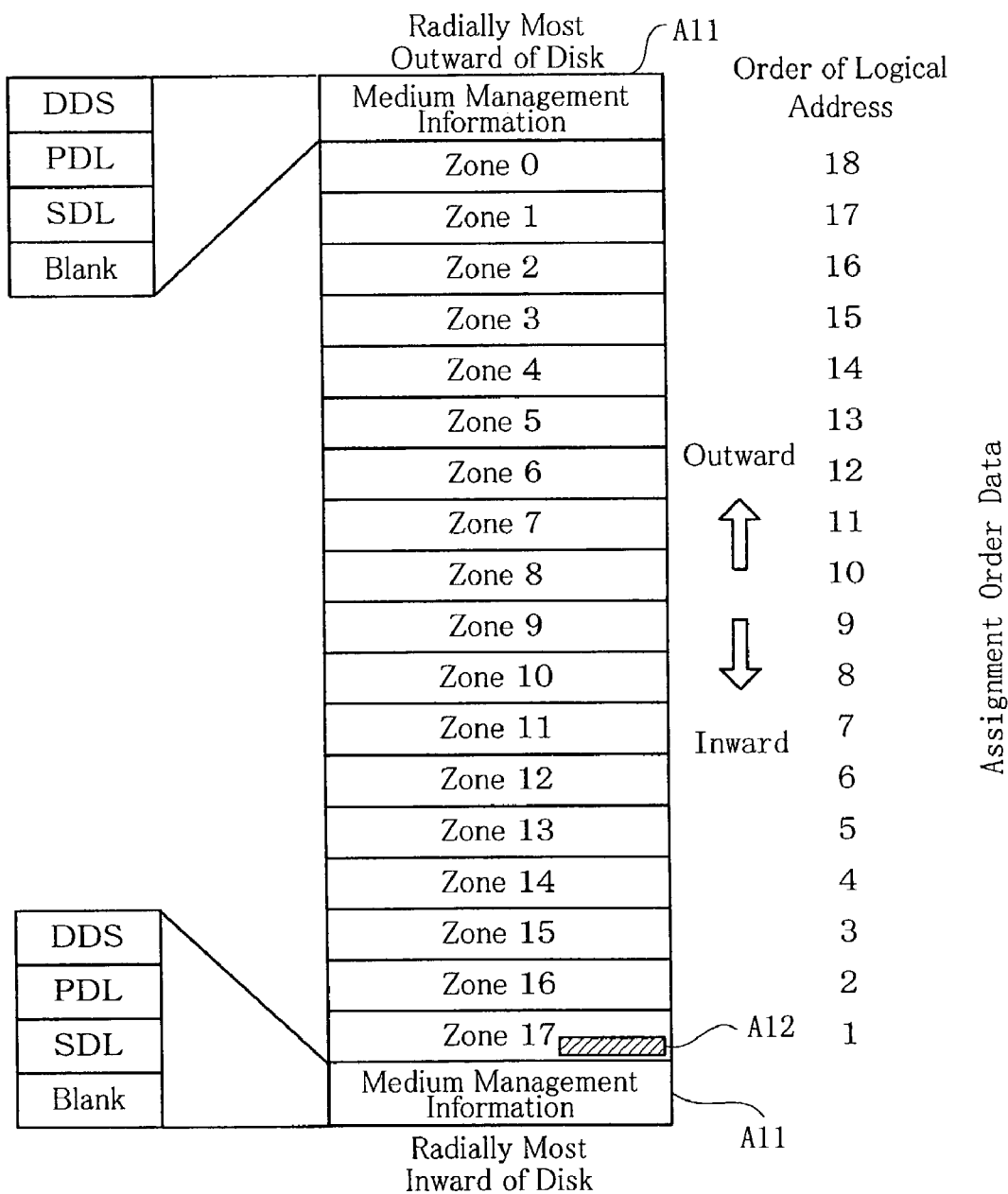
FIG. 2 is a schematic diagram illustrating a magneto-optical disk in FIG. 1.
Figure 15:
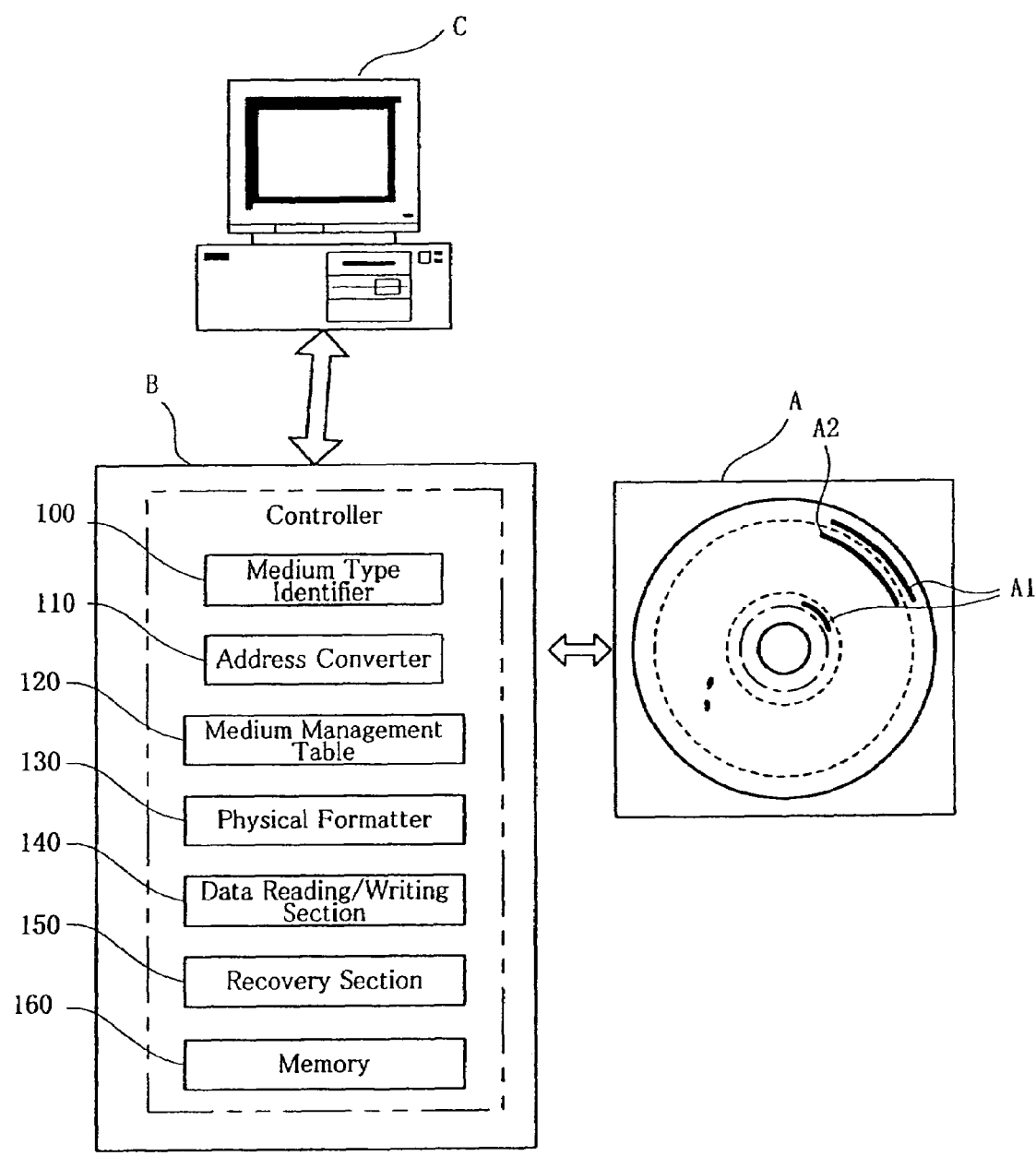
FIG. 15 is a block diagram illustrating a conventional procedure of physically formatting a magneto-optical disk.

The magneto-optical disk A10 has more areas in its recording surface. Specifically, there are a couple of areas, one being more outward and the other being more inward of the recording area A13. These extra areas are used for storing medium management information A11. One of the zones in the recording area A13 stores file management information A12. FIG. 1 and FIG. 2 show a 1.3 GB magneto-optical disk A10 as an example, in which the file management information A12 is stored in the radially most inward zone of the recording area A13. This arrangement is different from the standard arrangement shown in FIG. 15 and FIG. 16, and is a result of change performed on the basis of situation in the physical formatting or in response to a request from the personal computer C10. Note that FIG. 1 and FIG. 2 only show an example.

The medium management information A11 includes a DDS illustrated in FIG. 3, as well as a PDL and an SDL. In particular, the DDS includes allocation order data in its byte numbers 40–57. The allocation order data indicates an order according to which logical addresses are assigned to the zones. The allocation order data can be altered depending upon situations in the physical formatting to be described later and upon request from the personal computer C10. The file management information A12 indicates addresses for locating files stored in the recording area A13 as well as file sizes. Whenever a file is read/written on the magneto-optical disk A10, reference and update are made to the file management information A12. For this reason, the zone including the file management information A12 is accessed most frequently. Further, the file management information A12 is stored at a zone that has the smallest logical address.

As shown in FIG. 1, the recorder/player B10 includes a controller 2, an optical head 3, a magnetic head 4, and a motor driving circuit 5. The controller 2 includes a CPU 11, a RAM 12, a ROM 13, an EEPROM 14 and an interface circuit 15. These CPU 11, RAM 12, ROM 13, EEPROM 14 and the interface circuit 15 are interconnected via a bus line 16. The bus line 16 includes a data bus, an address bus and a control signal bus.

The recorder/player 10, which works in accordance with various commands from the personal computer C10, performs physical formatting of a magneto-optical disk A10, and performs reading/writing of files if the magneto-optical disk A10 is already physically formatted. The controller 2 controls the optical head 3, the magnetic head 4, and the motor driving circuit 5 under the direction from the personal computer C10. The optical head 3 and the magnetic head 4 make access to the unit recording areas (sectors) of the magneto-optical disk A10, under the control provided by the controller 2. The motor driving circuit 5, controlled by the controller 2, drives a motor for turning the magneto-optical disk A10 and motors for moving the optical head 3 and the magnetic head 4.

The CPU 11 provides control over the entire controller 2. The RAM 12 provides the CPU 11 with a work area for storing various data. The ROM 13 stores programs for the CPU 11 to operate. The EEPROM 14 stores a variety of information, including a medium management table to be described later with reference to FIG. 5.

Figure 4:
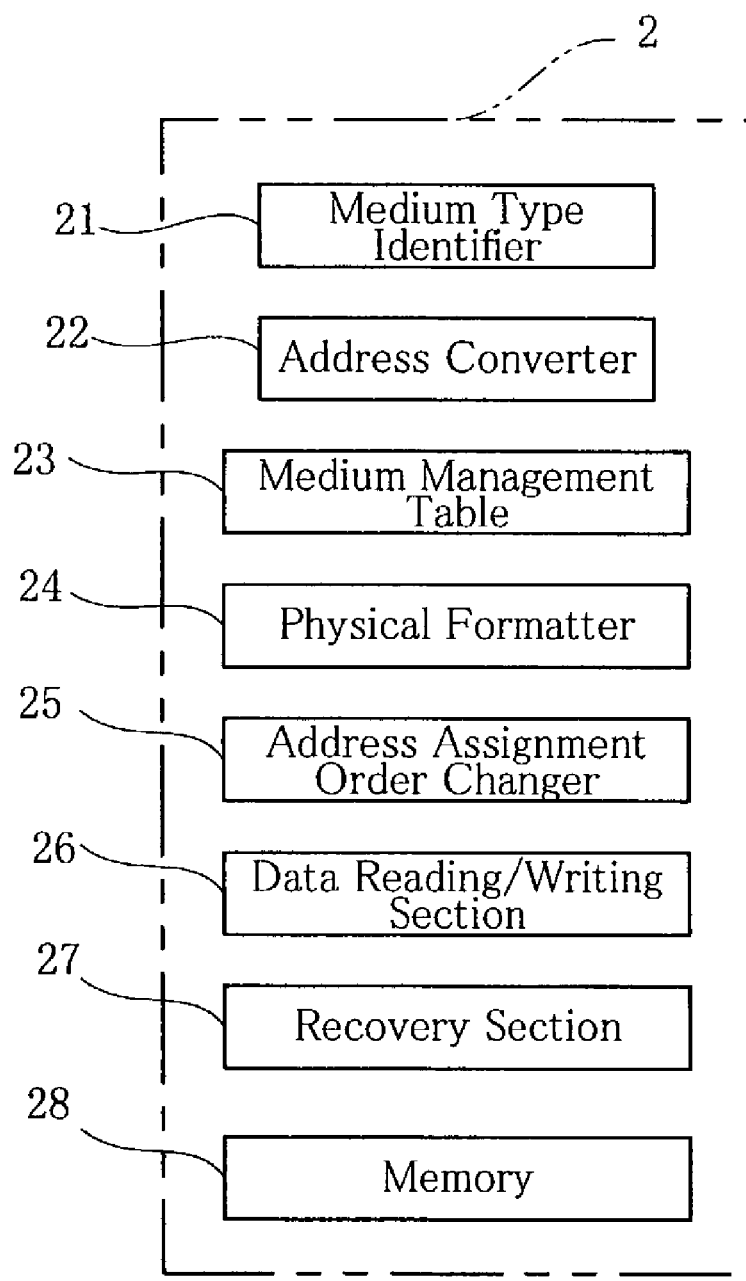
FIG. 4 is a functional block diagram of a controller in FIG. 1.

The controller 2 can be illustrated as in a functional diagram in FIG. 4, and includes a medium type identifier 21, an address converter 22, a medium management table 23, a physical formatter 24, an address assignment order changer 25, a data reading/writing section 26, a recovery section 27, and a memory 28. Specifically, the CPU 11 provides the medium type identifier 21, the address converter 22, the physical formatter 24, the address assignment order changer 25, the data reading/writing section 26, and the recovery section 27. The RAM 12 provides the memory 28. The EEPROM 14 provides the medium management table 23.

The medium type identifier 21 reads the medium management information A11 from the magneto-optical disk A10, and identifies the type of the disk.

The address converter 22, which is called up when the personal computer C10 requests reading/writing of files or data at specified logical addresses, makes reference to the medium management table 23, the medium management information A11 and the file management information A12 on the magneto-optical disk A10, and obtains physical addresses.

The medium management table 23 stores, as shown in FIG. 5, various kinds of information set forth for each type of the disks. This information includes the logical address assignment order data, and this assignment order data in this medium management table 23 is changed accordingly as changes are made to the medium management information A11.

The physical formatter 24, assigns logical addresses to each zone in accordance with the assignment order data stored in the medium management table 23, and at the same time, writes an initializing data onto the first sector through the last sector of each zone, in the order from a zone having the smallest logical address through a zone having the largest logical address, thereby performing the physical formatting. During the physical formatting, the physical formatter 24 detects defective sectors which fall into the category of primary defect, i.e. those sectors which do not accept address assignment, and counts a total number of defective sectors for each zone. The number of defective sectors is represented by an average for each zone; however, the number may be a simple accumulation for each zone. If the writing of initializing data is not successful, the physical formatter 24 has the recovery section 27 try the writing of initializing data (this is called retry procedure), and counts a number of retries attempted. Here again, the number of retries may be represented by a ratio, i.e. a count for a zone vs. a total count for all the zones, or may be a simple accumulation for each zone. Physical addresses and a quantity of the defective sectors, and the number of retries attempted are stored temporarily in the memory 28.

The address assignment order changer 25 rewrites the logical address assignment order data so that the logical address assignment will start from the zone found to include the fewest defective sectors during the physical formatting. Further, the address assignment order changer 25 can rewrite the logical address assignment order data so that the logical address assignment will start from a zone experienced the fewest retries during the physical formatting. Still further, the address assignment order changer 25 can rewrite the logical address assignment order data in accordance with a request made by the personal computer C10 at the time of the physical formatting. During the above, there is no need for assigning the logical addresses to all the zones, but the logical addresses may be assigned only to the zones specified by the personal computer C10.

The data reading/writing section 26 performs reading/writing of files or data in accordance with the physical addresses obtained by the address converter 22.

The recovery section 27 performs the retry until a predetermined number of retries are reached, when the physical formatter 24 fails to write initializing data.

Figure 6:
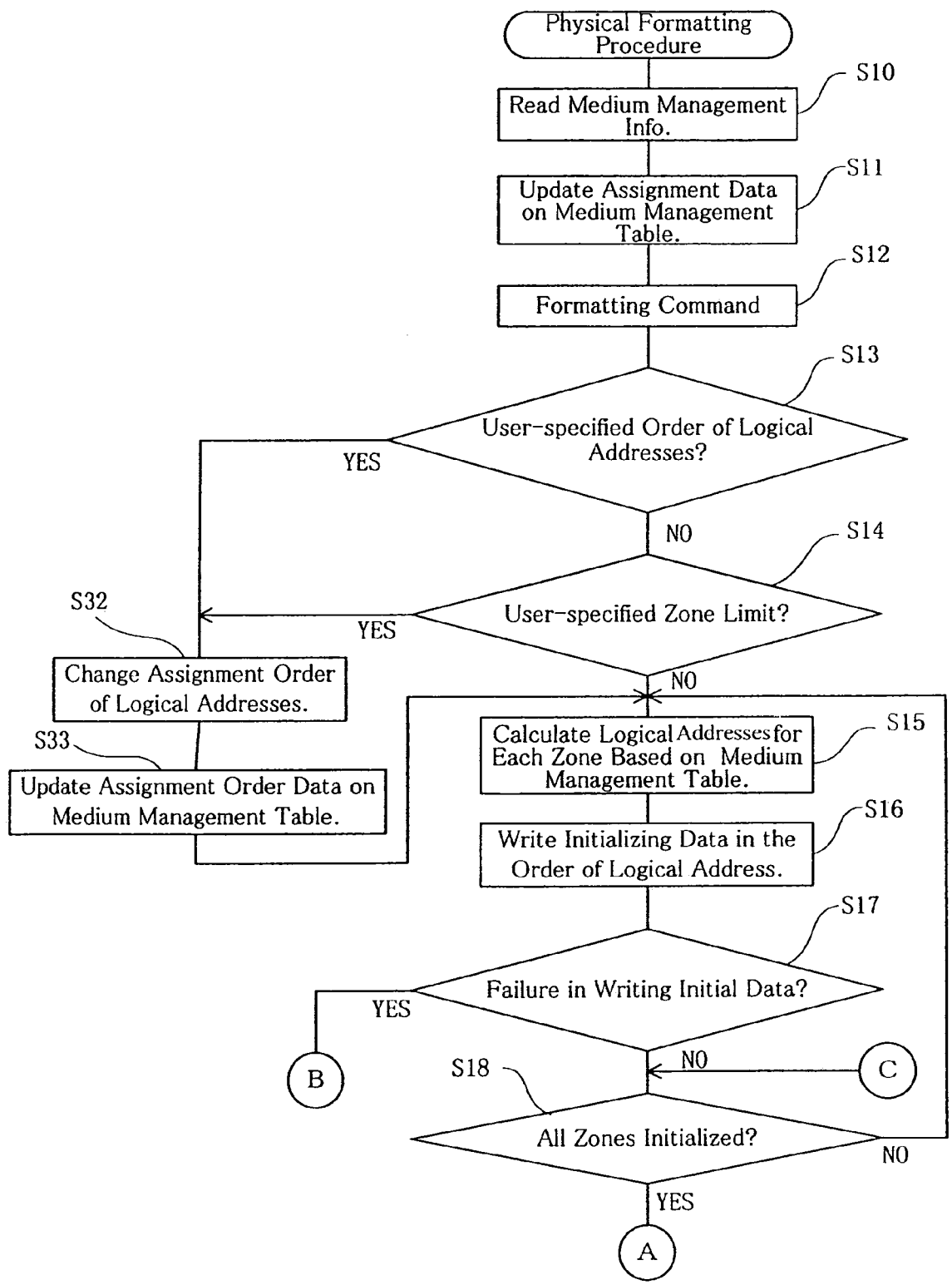
FIG. 6 is a flowchart according to the first embodiment.
Figure 7:
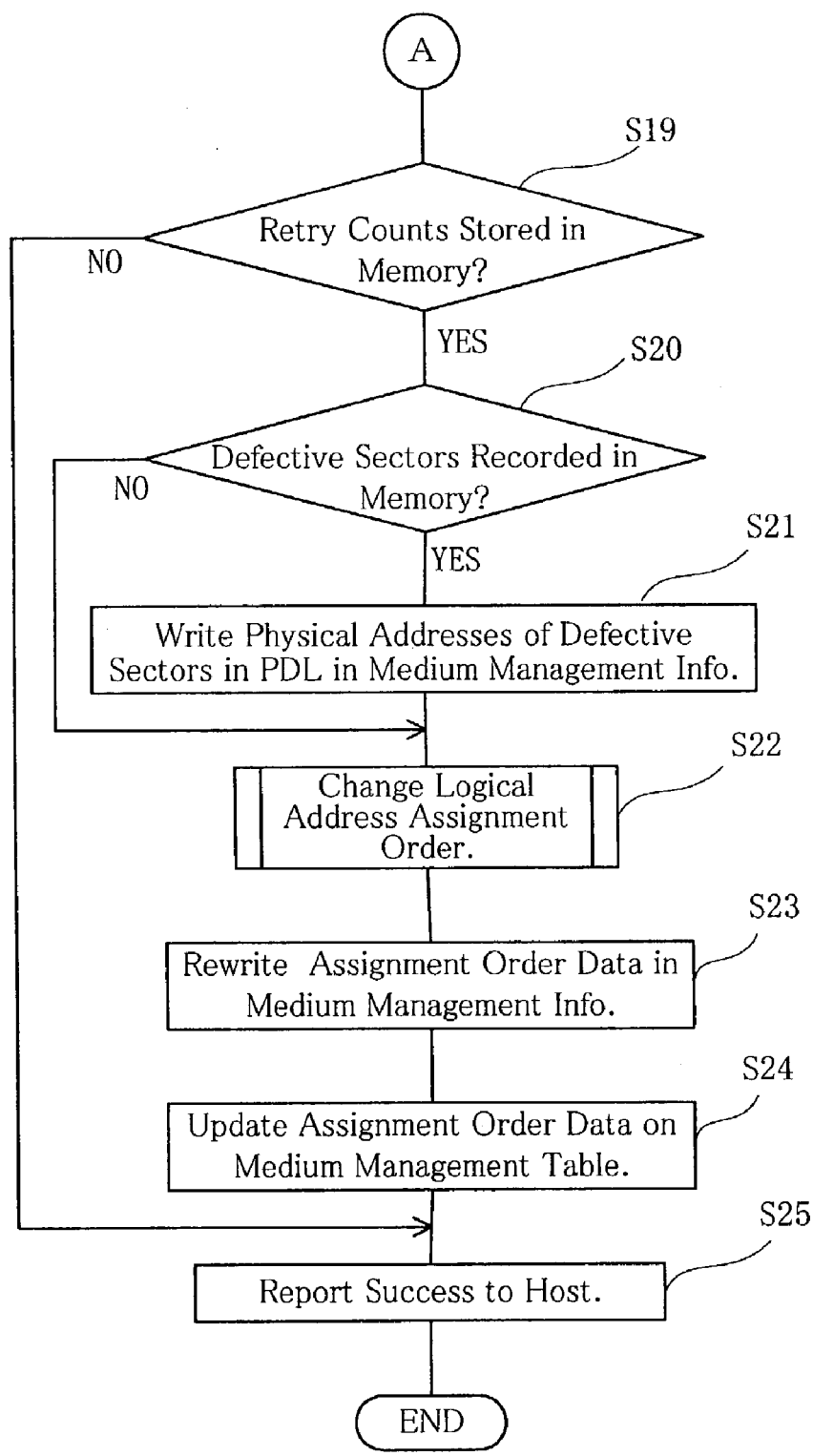
FIG. 7 is a continuation of the flowchart from FIG. 6.
Figure 8:
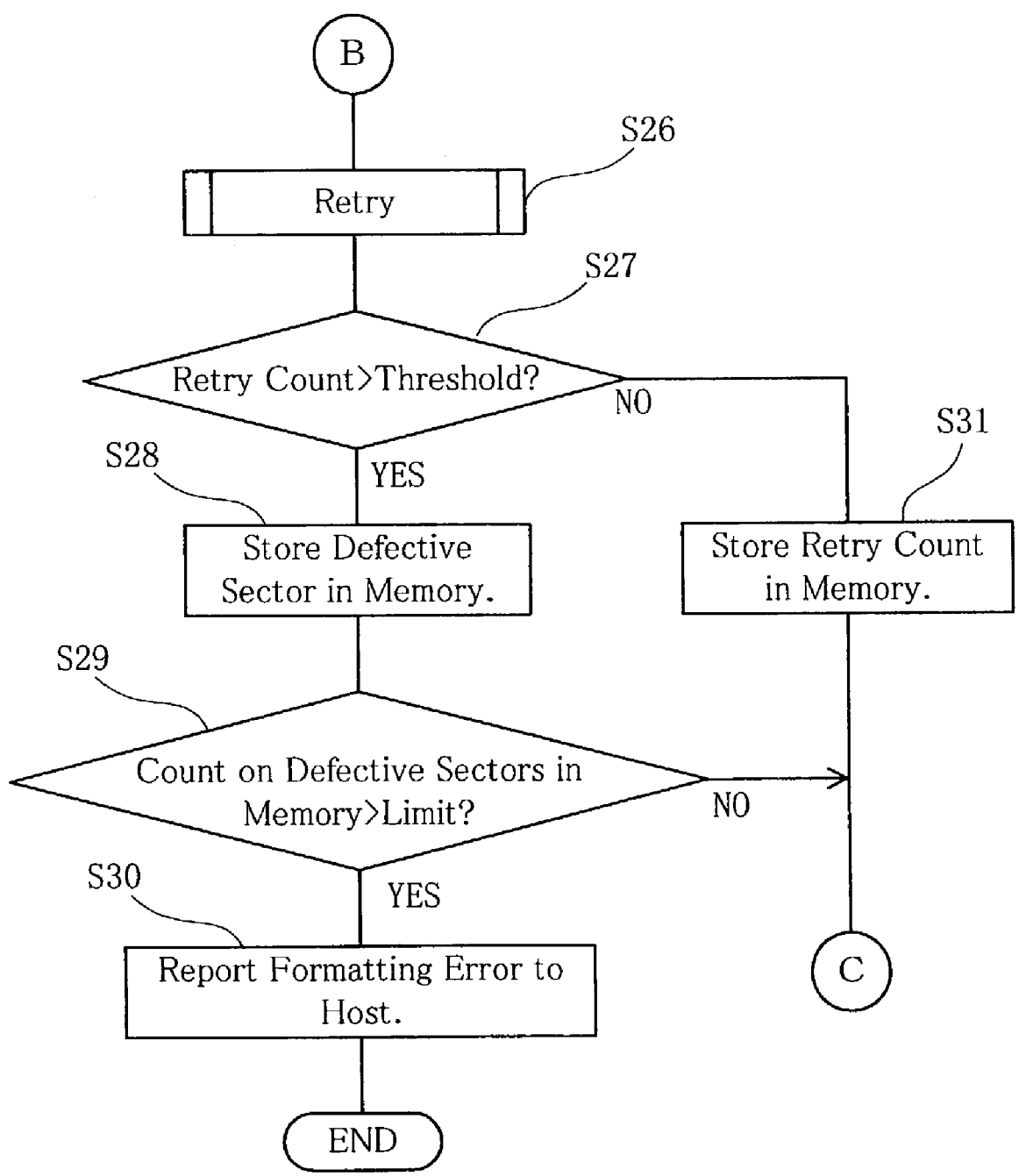
FIG. 8 is a continuation of the flowchart from FIG. 6.

Next, an operation performed for physically formatting a magneto-optical disk A10 will be described with reference to a flowchart given in FIG. 6 through FIG. 8.

First, when the magneto-optical disk A10 is loaded into the recorder/player B10, the CPU 11 reads the medium management information A11 on the magneto-optical disk A10 (S10).

The CPU 11 then looks up the assignment order data which is stored in the DDS on the medium management information A11, and accordingly changes assignment order data on the medium management table (S11).

Thereafter, the CPU 11 accepts a "start physical formatting" command from a personal computer C10 functioning as the host (S12), and checks if the command from the host includes a direction that specifies an arbitrary order of logical addresses (S13).

If the given command does not specify the order of logical addresses (S13: NO), the CPU 11 makes another check if the command from the host limits zones to which the logical addresses are to be assigned (S14).

If the command does not include the limit to the zones (S14: NO), the CPU 11 begins its procedure for the physical formatting by reading the changed assignment order data on the medium management table and calculating a logical address for each zone in accordance with the given order of assignment (S15).

Next, the CPU 11 writes initializing data onto the zones, starting from the zone which has been assigned with the smallest of the calculated logical addresses through the zone assigned with the largest (S16). In each zone, a logical address is assigned to each sector as well as initializing data written onto each sector, whereby each zone is physically formatted.

If the process finds no defective sectors that fall into the category of primary defect (S17: NO), i.e. if all of the initializing data writing attempts have been successful, then the CPU 11 checks if the writing of initializing data has been completed for all of the zones (S18).

When the writing has been complete for all of the zones (S18: YES), the CPU 11 checks if there is any retry counts stored in the RAM 12 (S19). Description will be given later as to how the retry counts are stored in the RAM 12.

When retry counts are found in the RAM 12 (S19: YES), the CPU 11 further checks if the RAM 12 stores physical addresses of defective sectors (S20). Description will be given later as to how the physical addresses of defective sectors are stored in the RAM 12.

When physical addresses of defective sectors are found in the RAM 12 (S20: YES), the CPU 11 stores the physical addresses of the defective sectors in the form of PDL in the medium management information A11 (S21).

Figure 16:
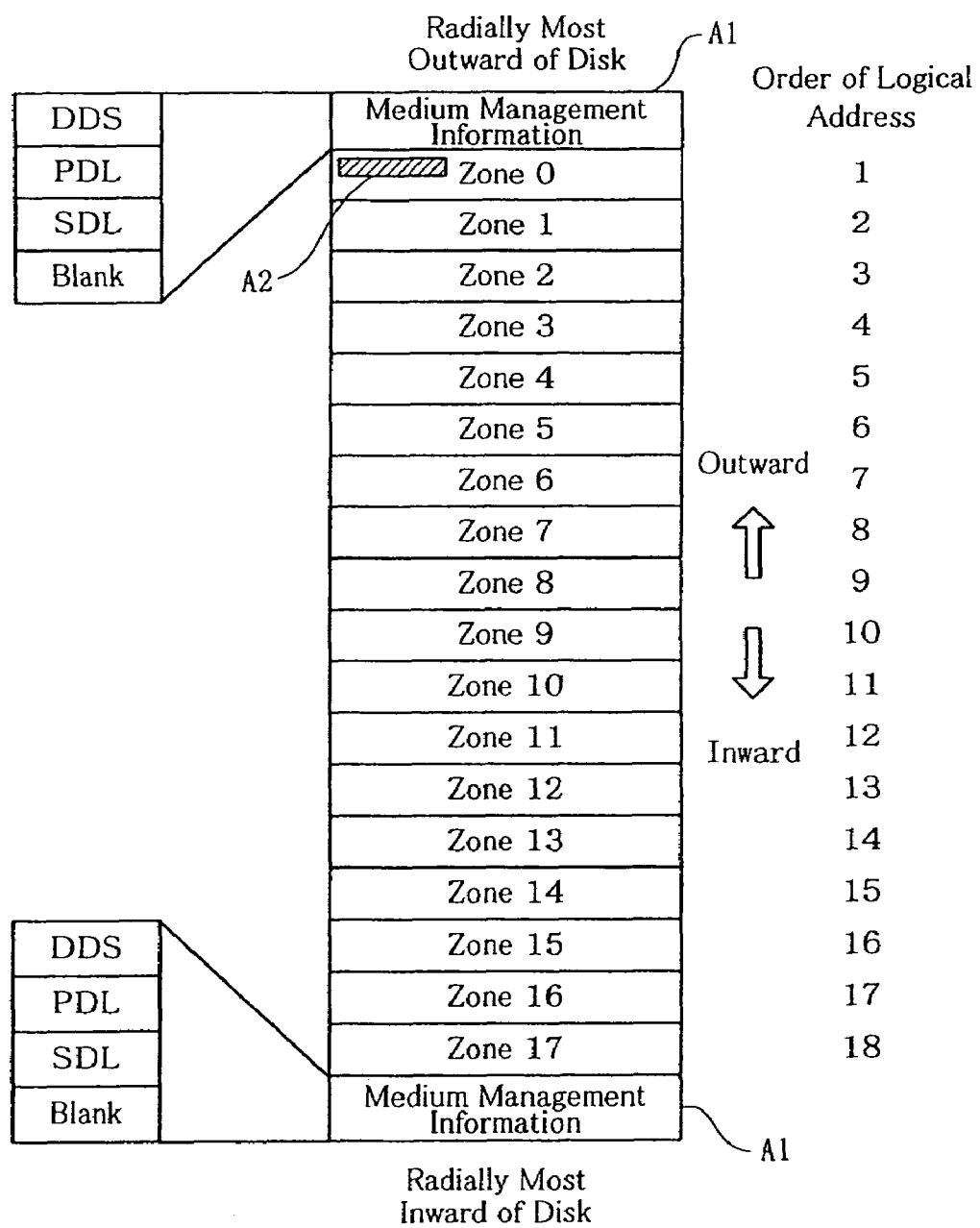
FIG. 16 is a diagram illustrating a conventional magneto-optical disk of a 1.3 GB capacity.
Figure 18:
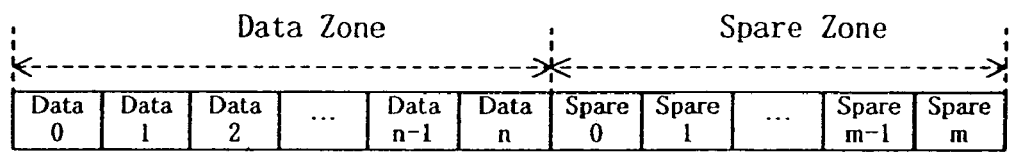
FIG. 18 is a diagram illustrating a zone without defect.
Figure 19:
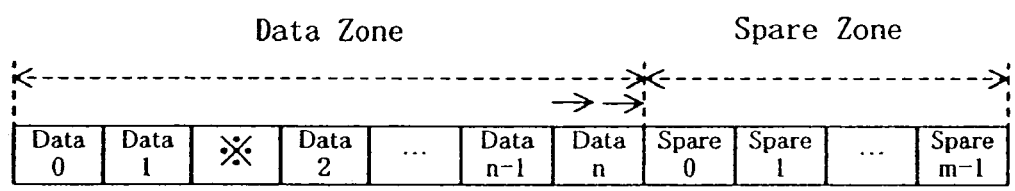
FIG. 19 is a diagram for describing a PDL and a primary defect.
Figure 20:
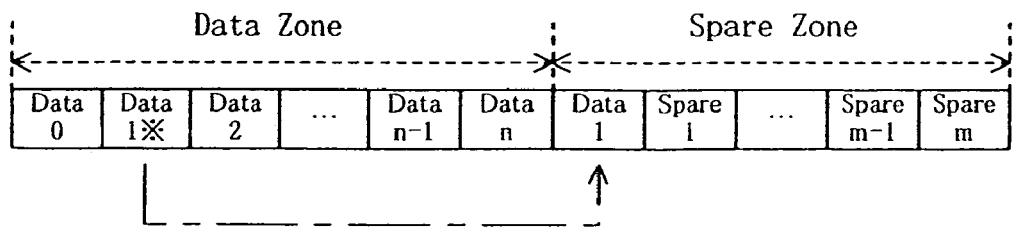
FIG. 20 is a diagram for describing a SDL and a secondary defect.

Then, the CPU 11 changes the order of assigning the logical addresses according to which the original assignment was made (S22). This change in the logical address assignment order is performed in the following way:

For example, take a case of a 1.3 GB magneto-optical disk A10. The original assignment order data specifies, as shown in FIG. 16, that logical addresses be assigned from radially most outward zone through the most inward zone. Now, assume that retry procedures were performed during the process. Then, the logical addresses are reassigned in the order starting from a zone which has the smallest retry count through a zone which has the largest retry count, and the assignment order data is changed accordingly. At an extreme case, as shown in FIG. 2, the logical addresses are assigned from the radially most outward zone toward the radially most inward zone. Obviously, the assignment order in FIG. 2 can be changed to such an order as shown in FIG. 16, or the logical addresses can be assigned in a random order not following the physical order in which zones are located.

Now, take another case in which defective sectors are detected while logical addresses are assigned according to the original assignment data. In this case, the logical addresses are reassigned in the order starting from a zone which includes the fewest defective sectors through a zone which has the largest number of defective sectors, and the assignment order data is changed accordingly. Here again, the resultant order can be just as in the examples given in the previous paragraph.

It should be noted here that these two procedures, i.e. an assignment data changing procedure based on the number of retries and an assignment data changing procedure based on the number of defective sectors, are executed selectively.

Now, assume further, that the original assignment of the logical addresses was started from a land or from a groove in each zone. For example, assume that a logical address was assigned first to a land, then to a groove, and then to a land, and then to a groove and so on, in alternation. In this case, the assignment order data will be changed so that the logical address assignment will be started from either a land or a groove, i.e. the group having a smaller retry count or including fewer defective sectors. For example, the order can be changed contrary to the above, so that the logical address is assigned first to a groove, then to a land, and then to a groove, then to a land and so on.

Alternatively, assume that the original assignment of the logical addresses was started from lands or from grooves in each zone. For example, assume that the logical address was assigned first to a land, then to another land, . . . and then to a groove and then to another groove and so on. In this case, the assignment order data will be changed so that either the lands or the grooves having a smaller retry count or including fewer defective sectors will be the first to be assigned with the logical addresses. For example, the order can be changed contrary to the above, so that the logical addresses are assigned first to the grooves, and then to the lands.

After changing the logical address assignment order as described above, the CPU 11 rewrites the assignment order data contained in the medium management information A11 accordingly as the change was made (S23).

Further, the CPU 11 also rewrites the assignment order data contained in the medium management table accordingly as the change was made (S24).

Finally, the CPU 11 reports the host about a successful completion of the physical formatting (S25), and ends the physical formatting procedure. With the above, the file management information A12 which is to be located at the smallest address and closer to the head of the entire recording area A13, will be placed in the zone which has the smallest retry count or including the fewest defective sectors, and further, either in the lands or in the grooves which have experienced a fewer retries or which include fewer defective sectors, within this particular zone.

In step S20, when the RAM 12 does not store any physical addresses of defective sectors (S20: NO), the CPU 11 executes step S22 and changes the logical address assignment order only on the basis of the retry count.

In step S19, when the RAM 12 does not store any retry counts (S19: NO), i.e. when there was no defective sectors found and thus no retry procedure was performed, the CPU 11 brings the process down to step S25, since there is no need for changing the logical address assignment order.

In step S18, when the writing of initializing data has not been complete for all of the zones (S18: NO), then the CPU 11 brings the process back to step S15 to continue with the writing of initializing data for the remaining zones.

In step S17, when the writing of initializing data was not successful (S17: YES), the CPU 11 executes the retry procedure thereby attempting the writing of initializing data again (S26).

During the retry procedure, the CPU 11 counts the number of retries attempted, and when the retry count exceeds the predetermined threshold value (S27: YES), the CPU 11 determines that the unit recording area in process of the retry procedure is a defective sector of the primary defect category, and then stores the address of the defective sector in the RAM 12 (S28). The physical address of the defective sector thus stored in the RAM 12 will be used in steps S20 and S21. The retry count is accumulated for each zone. The number of retries spent for detecting the defective sector is not included in the accumulation for the zone. Alternatively however, the number may be included, in which case the RAM 12 will also store the retry count.

Further, the CPU 11 checks if the number of defective sectors has exceeded a predetermined maximum limit (S29).

When the number of defective sectors has exceeded the predetermined maximum limit during the retry procedure (S29: YES), the CPU 11 reports to the host that a disk error has occurred (S30), cancels the physical formatting procedure, and ends the process.

On the other hand, when the number of defective sectors is not greater than the predetermined maximum limit (S29: NO), the CPU 11 brings the process back to S18.

In step S27, when the retry procedure is successful within the predetermined number of retries given as the threshold value (S27: NO), i.e. when the sector is not detected as defective, the CPU 11 then records a retry count, i.e. the number of retries which was necessary until the retry was finally become successful, in the RAM 12 (S31), and brings the process back to S18. The retry count stored in the RAM 12 in this step will be used in step S19.

In step S14, when the command from the host includes a limitation on the zones (S14: YES), the CPU 11 changes the logical address assignment data (S32) so that the logical addresses will be assigned only to the specified zones. Accordingly, the change will be made also to the logical address assignment order data included in the medium management table (S33). For example, take a case that the user specifies in a command a physical formatting of a 1.3 GB magneto-optical disk A10 only for a half of its capacity instead of the full 1.3 GB capacity. In such a case, the assignment data will be changed so that physical addresses will be assigned only to zones accounting for a half of the 1.3 GB capacity. The magneto-optical disk A10 thus formatted becomes available for reading/writing of files and data, but only by using part of the full potential capacity. Thereafter, the CPU 11 brings the process to step S15.

In step S13, if the command from the host includes a request for a specific order of logical addresses (S13: YES), the CPU 11 changes the logical address assignment order (S32) so that the logical addresses will be assigned to the zones in the order specified by the command. Accordingly, the change will be made also to the logical address assignment order data included in the medium management table (S33) For example, take the case in FIG. 16, in which the original order of logical address assignment is from the radially most outward zone through the radially most inward zone. If the user selects a command and thereby specifies that the assignment order be reversed, then the new order of logical address assignment is from the radially most inward zone through the radially most outward zone, making possible to obtain a magneto-optical disk A10 which is formatted in a way different from the way it normally is.

Therefore, when reading/writing of files is performed to a magneto-optical disk A10 that is physically formatted according to the first embodiment, the file management information A12 which is always referred to and then updated is located in the zone which includes the least number of defects. As a result, it becomes possible to guarantee the highest possible probability for such procedures as erasing/writing/verifying as well as reading to be completed at the first attempt. In addition, it becomes possible to concentrate the access on the zones which requires the least possible time for detection of defective sectors or execution of retries, thereby speeding up the file access.

Further, when there is such a request from the host as to physically format only a part of the full capacity of a magneto-optical disk A10, it has now become possible to assign logical addresses only to zones in a range specified by the request. This makes possible to complete the formatting in a shorter time than required for formatting for the full capacity, achieving a magneto-optical disk A10 and a method of formatting which are convenient to the users. In addition, the achieved order of logical address assignment is highly efficient in view of file management by the OS.

Next, a second embodiment will be described.

Figure 9:
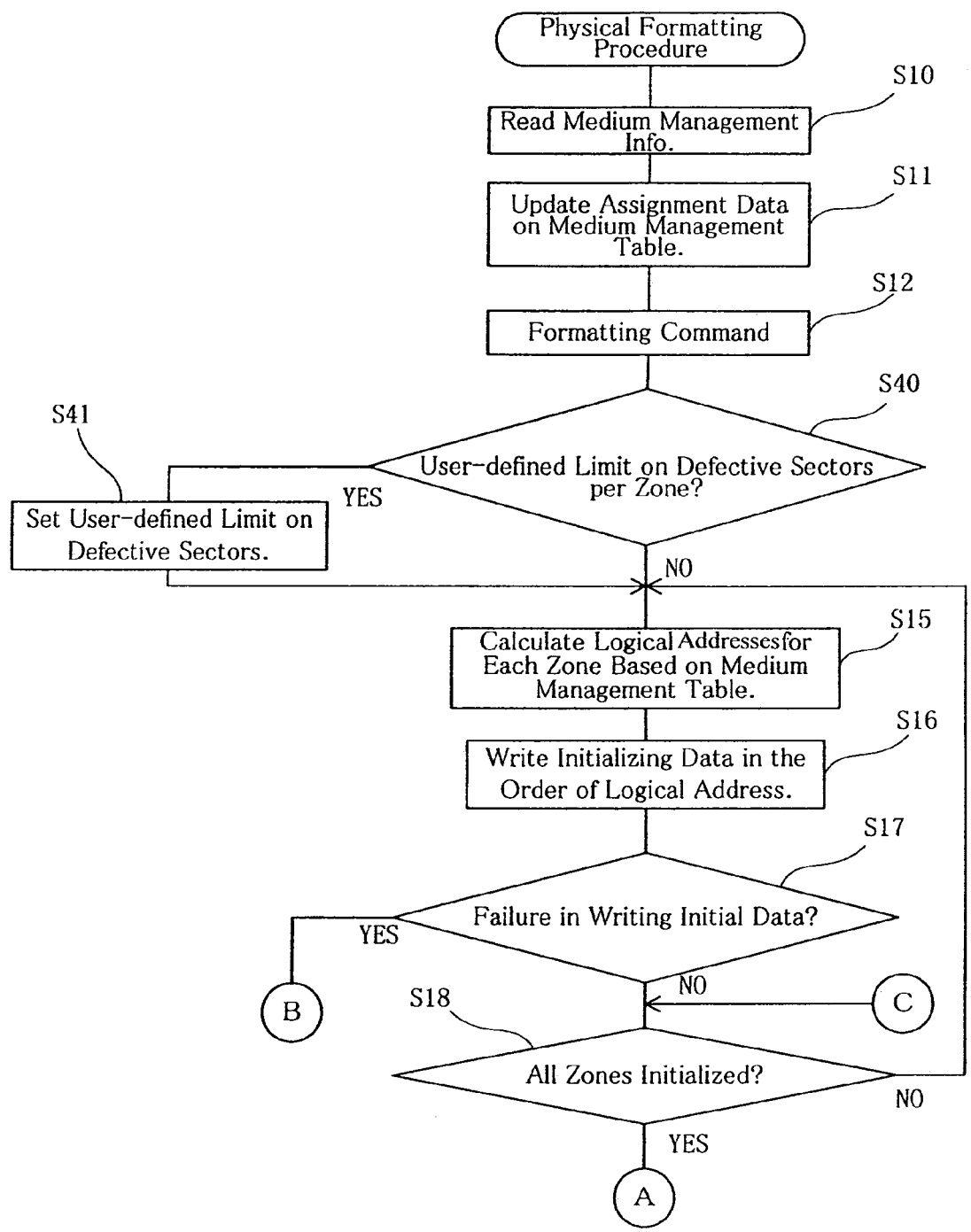
FIG. 9 is a flowchart according to a second embodiment.
Figure 10:
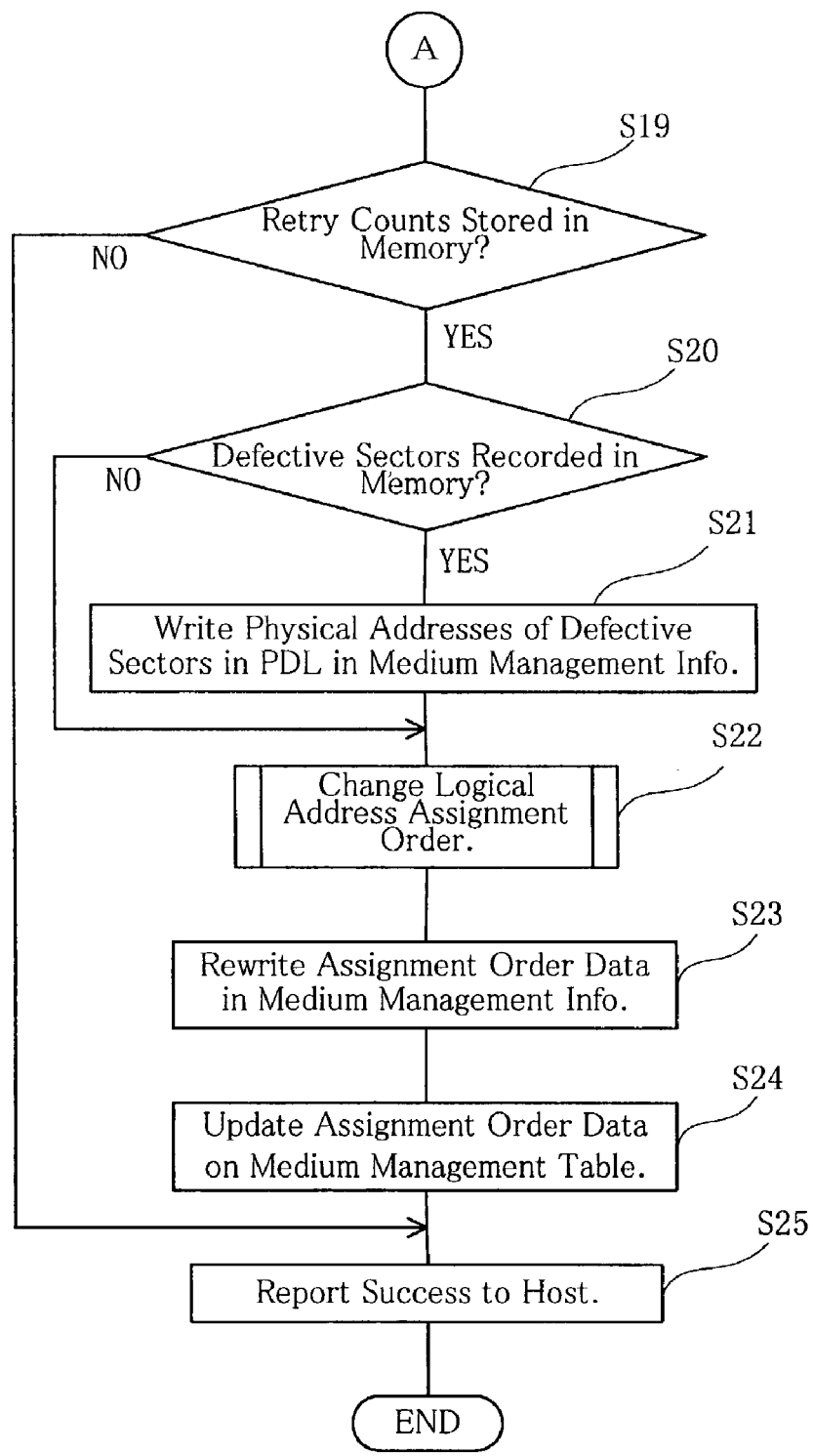
FIG. 10 is a continuation of the flowchart from FIG. 9.
Figure 11:
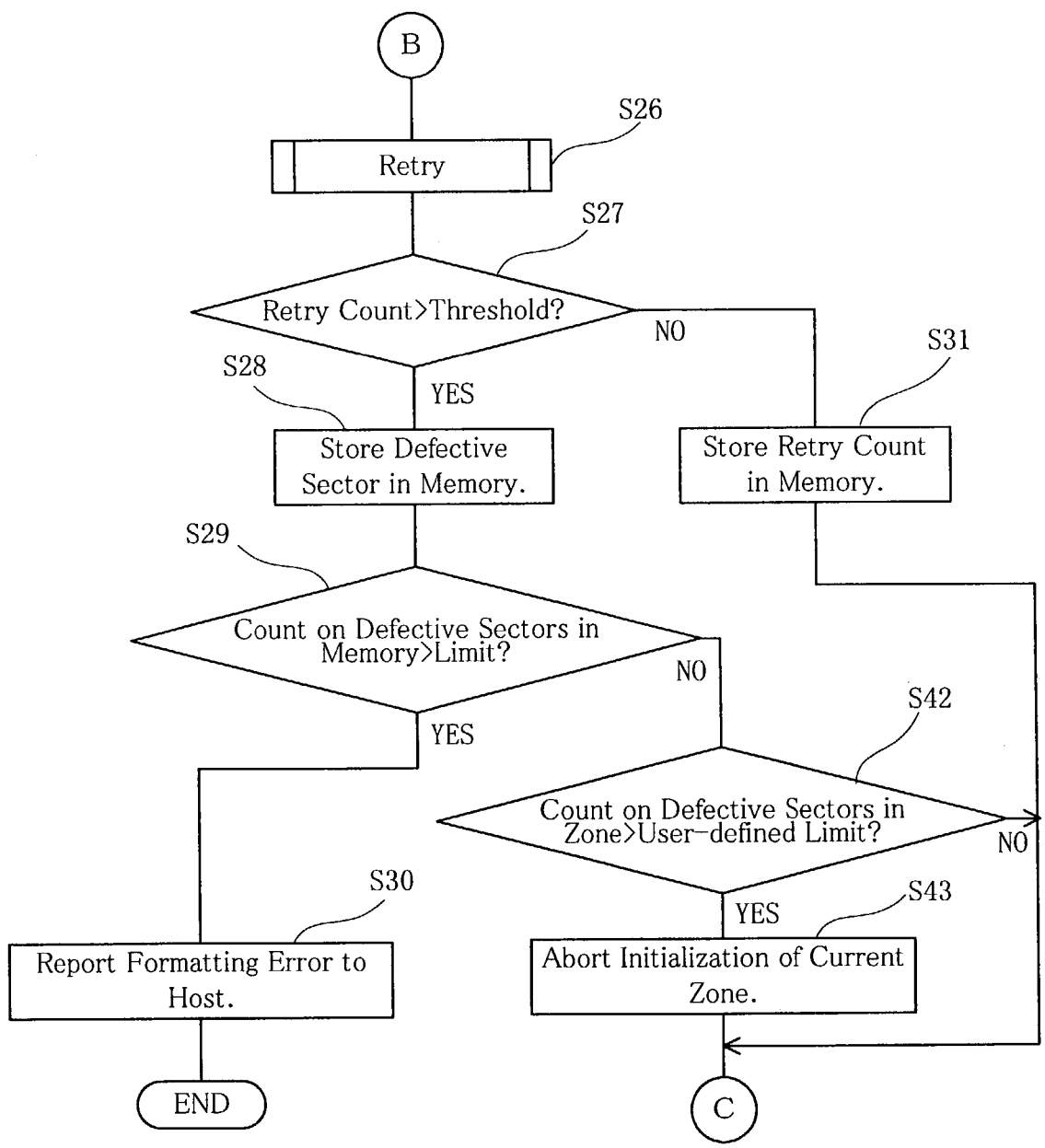
FIG. 11 is a continuation of the flowchart from FIG. 9.

The second embodiment is similar to the first embodiment, and can be illustrated in the same drawings of FIG. 1 through FIG. 5. However, there is a slight difference from the first embodiment in the physical formatting procedure, which will be described with reference to a flowchart given in FIG. 9 through FIG. 11. Note that the flowchart contains same steps as in the first embodiment. These steps will be identified by the same step numbers and not be described again.

A major difference in the second embodiment from the first embodiment lies in that steps S13 and S14 are replaced by steps S40 and S41, and new steps S42 and S43 are added accordingly. Specifically, if the command from the host includes an upper limit to the number of defective sectors allowed per zone (S40: YES), the CPU 11 set the upper limit to the number of the defective sectors (S41) on a register or in the RAM 12, according to the command, before bringing the process down to S15. If the command from the host does not include the upper limit to the number of defective sectors per zone (S40: NO), the process simply goes down to S15, as in the case S14: NO.

Thereafter, in S29, even if the number of defective sector is not greater than the maximum tolerable limit (S29: NO), the CPU 11 further checks if the number of the defective sectors exceeds the upper limit set in step S41 (S42).

When the number of defective sectors has exceeded the upper limit (S42: YES), the CPU 11 cancels the initial data writing to the current zone, assigns no logical address to the zone, and makes the zone unavailable for use (S43). Then, the CPU 11 brings the process to S18. Specifically, even if the number of defective sectors in all of the zones to be formatted is within a given maximum tolerable range, a zone is excluded if it includes more defective sectors than specified by the host. This makes possible to speed up file access.

On the other hand, in step S42, when the number of defective sectors is not greater than the upper limit (S42: NO), the CPU 11 simply brings the process to step S18.

Thus, according to the second embodiment, the same advantages can be enjoyed as in the first embodiment, and in addition, it becomes possible to exclude zones that have a large number of defective sectors and therefore tend to slow down the access, according to a request by the user. This makes possible to make a magneto-optical disk A10 of a required quality for a specific use, and to speed up the file access in general.

For instance, when a magneto-optical disk A10 is to be used for a recording/playing purpose which would not allow any defective sectors per zone, the upper limit can be set to zero at the time of physical formatting, so that a stable recording/playing can be guaranteed.

Next, a third embodiment will be described.

Figure 12:
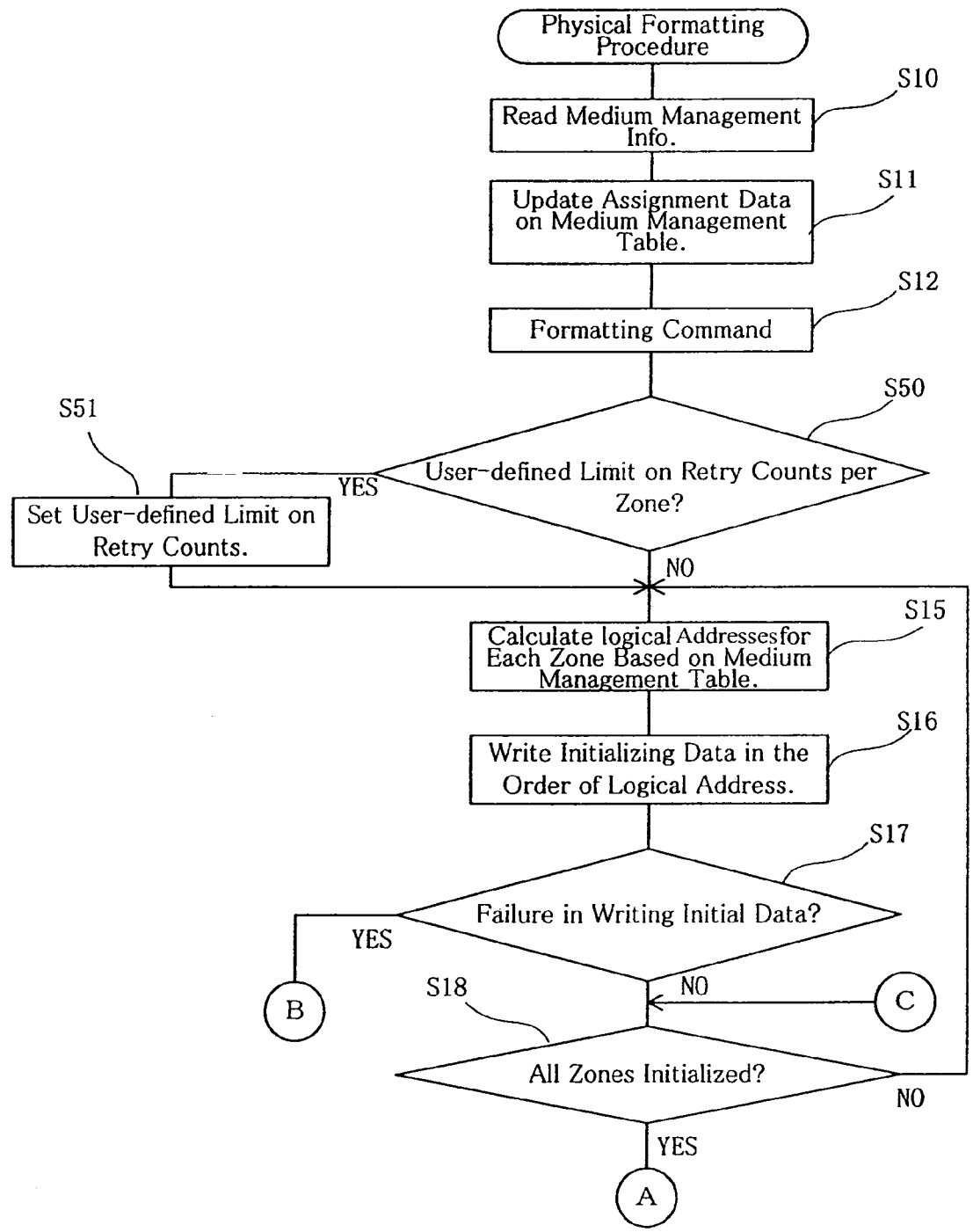
FIG. 12 is a flowchart according to the third embodiment.
Figure 13:
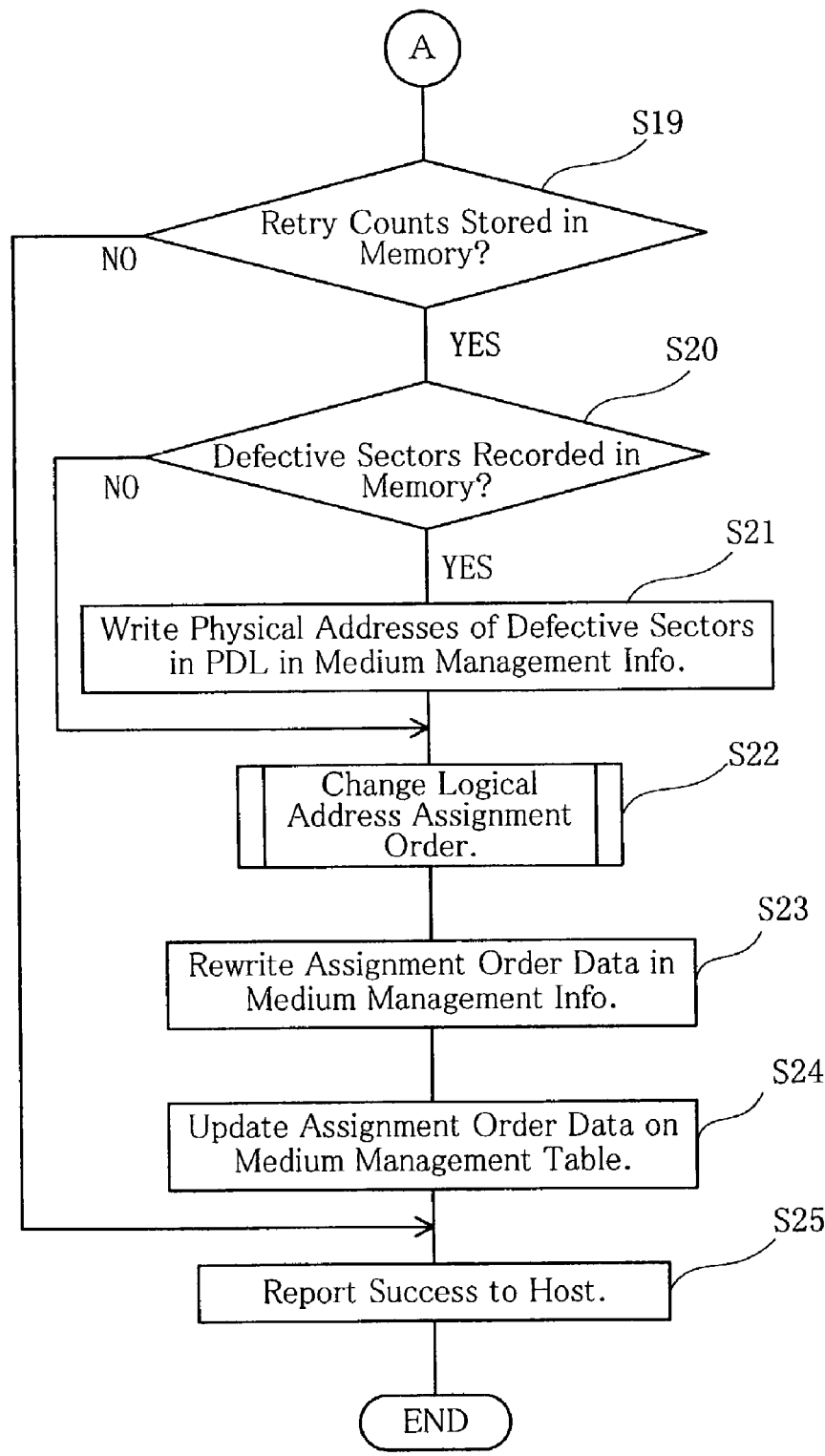
FIG. 13 is a continuation of the flowchart from FIG. 12.
Figure 14:
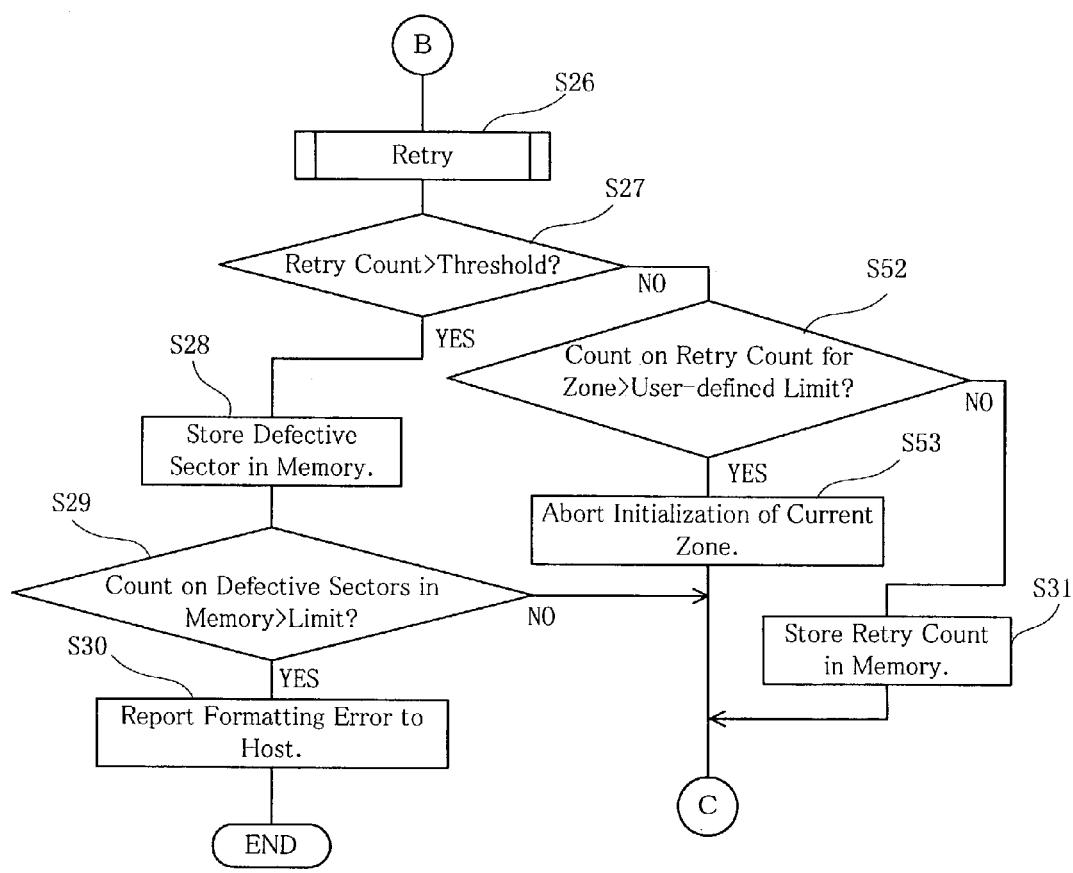
FIG. 14 is a continuation of the flowchart from FIG. 12.

The third embodiment is similar to the first embodiment, and can be illustrated also in the same drawings of FIG. 1 through FIG. 5. However, there is a slight difference from the first embodiment in the physical formatting procedure, which will be described with reference to a flowchart given in FIG. 12 through FIG. 14. Note that the flowchart contains same steps as in the first embodiment. These steps will be identified by the same step numbers and not be described again.

A major difference in the third embodiment from the first embodiment lies in that steps S13 and S14 are replaced by steps S50 and S51, and new steps S52 and S53 are added accordingly. Specifically, if the command from the host includes an upper limit to the number of retries per zone (S50: YES), the CPU 11 set the upper limit to the number of retries (S51) on a register or in the RAM 12, according to the command, before bringing the process down to S15. If the command from the host does not include the upper limit to the number of retries per zone, the process simply goes down to S15, as in the case S14: NO.

Thereafter, in S27, even if the retry procedure is successful within the given retry count set by the threshold value (S27: NO), the CPU 11 further checks if the accumulated retry count for the zone exceeds the upper limit set in step S51 (S52).

When the number of retries has exceeded the upper limit (S52: YES), the CPU 11 cancels the initial data writing to the current zone, assigns no logical address to the zone, and makes the zone unavailable for use (S53). Then, the CPU 11 brings the process to S18. Specifically, even if the number of retries in the entire area to be formatted is not greater than the threshold value, a zone is excluded if its retry count has exceeded the upper limit specified by the host. This makes possible to speed up file access.

On the other hand, in step S52 when the retry count is not greater than the upper limit (S52: NO), the CPU 11 stores the retry count in the RAM 12 (S31), and then brings the process to step S18.

Thus, according to the third embodiment, the same advantages can be enjoyed as in the first embodiment, and in addition, it becomes possible to exclude zones which have a high probability of receiving the retry procedure again and again, according to a request from the user. This makes possible to make a magneto-optical disk A10 of a required quality for a specific use, and to speed up the file access in general.

For instance, when a magneto-optical disk A10 is to be used for a recording/playing purpose which would not allow any retries per zone, the upper limit can be set to zero at the time of physical formatting, so that a very stable recording/playing can be guaranteed.

It should be noted that the present invention is not limited to the embodiments described above.

For example, the recording disk may not be limited to the MOs, but can include MDs and a variety of iD-format magneto-optical disks. Further, the present invention is applicable to other kinds of disks such as optical disks of the phase-change type, the write-once type and soon, including for example DVDs and CD-ROMs, as well as to magnetic disks such as hard disks and floppy disks.

Further, the physical formatting may not only be made by the user with the personal computer C10, but also be made during manufacturing process of the magneto-optical disk when the magneto-optical disk 10 is shipped as formatted.

The operations provided by the CPU 11 of the recorder/player B10 may alternatively be performed by the CPU of the host personal computer C10.

The logical address assignment order data is stored in a blank space in the DDS shown in FIG. 3. Alternatively, the "Group Type" of the DDS may be expanded from a single-byte space to be a plural-byte space, so that the assignment order data can be stored in some of the bytes.

Another alternative can be that a flag is set in the DDS indicating if the logical address assignment order has been changed, and when the flag is not up, a conventional standard is applied in the assignment of the logical addresses.

The recorder/player B10 can perform physical formatting and data reading/writing to such conventional magneto-optical disks as of 230 MB, 540 MB, 640 MB and 1.3 GB capacities which contain unchangeable assignment order data as part of their medium management information, while maintaining control algorithm compatibility.

Generally, as shown in the medium management table in FIG. 5, in a magneto-optical disk A10, radially outward side has a higher turning speed and a higher recording/playing frequency, and therefore is believed to have a greater access efficiency than radially inward side. Based on this, the logical address assignment order data may be changed so that the assignment is started from the radially most outward side which has the highest recording/playing frequency. Since the access time for a sector becomes shorter with the increase in the recording/playing frequency, access speed to the file management information A12 stored in such particular zone can be made more quickly.

Still further, the logical address assignment order data may be changed so that the assignment is started from a zone that includes the largest number of sectors per track to a zone that includes the fewest of them. When the magneto-optical disk A10 is turning at a constant speed, the zone that has the largest number of sectors per tack has the shortest access time, and therefore, access to the file management information A12 stored in such particular zones can be made more quickly.

This arrangement reduces a probability that the file management information A12 is stored in a scattered manner in a plurality of zones and therefore has to be accessed while skipping zones. Thus, the arrangement can further speeds up the access. In addition, when it becomes necessary to find a replacement sector from unused spare sectors in the subsequent zone in the process of making up a secondary defect during reading/writing of a file or data, there is a low probability that the access must be made by jumping over zones. This can also lead to a speedy access.

When reading/writing of files/data is performed to a magneto-optical disk A10 which is physically formatted already, the assignment order data included in the medium management information A11 is copied onto the medium management table. In regard of this, for zones which are not assigned with logical addresses, there can be an arrangement that the order for such zones is indicated as "0" in the assignment order data, and these zones are not given converted physical addresses. With this arrangement, for example, it becomes possible to exclude zones which would require an unreasonably long time in reading/writing of files/data due to too many defective sectors. This provides an advantage that music, images and other data that must be processed as a continuous string of a certain length can be recorded/played without halt.

What is claimed is:

1. An optical disk drive for initializing an optical disk by dividing a recording area into zones and by assigning logical addresses to each of the zones, the disk drive comprising:
   a medium management table for providing rewritable assignment order data describing an order in which respective zones receive logical addresses;
   a formatter for performing the initialization of the optical disk while assigning logical addresses to one of the zones after another in accordance with the assignment order data; and
   an address assignment order changer for changing a logical address assignment order with respect to at least part of the zones, for rewriting a current assignment order data in the medium management table in accordance with the changed logical address assignment order, and for writing the rewritten assignment order data to the optical disk.

2. The optical disk drive according to claim 1, wherein the address assignment order changer changes the logical address assignment order in accordance with a situation of the initialization performed by the formatter.

3. The optical disk drive according to claim 1, wherein the changing of the logical address assignment order is performed in accordance with an instruction from a host computer.

4. The optical disk drive according to claim 1, wherein the formatter detects a defective sector in each of the zones when initializing the zone, the address assignment order changer changes the logical address assignment order in accordance with a number of defective sectors found in the respective zones.

5. The optical disk drive according to claim 4, wherein the address assignment order changer assigns no logical address to a zone in which the number of defective sectors found by the formatter is greater than a predetermined threshold.

6. The optical disk drive according to claim 5, wherein the threshold is set by an instruction from a host computer.

7. The optical disk drive according to claim 1, wherein the formatter counts a number of retrials for initializing each of the zones, the address assignment order changer changes the logical address assignment order in accordance with the number of retrials with respect to the respective zones.

8. The optical disk drive according to claim 7, wherein the address assignment order changer provides no logical address to a zone for which the number of retrials for initialization is greater than a predetermined threshold.

9. The optical disk drive according to claim 8, wherein the threshold is set by an instruction from a host computer.

10. A method of formatting an optical disk by dividing a recording area into zones and by assigning logical addresses to each of the zones, the method comprising the steps of:
causing a medium management table to provide rewritable assignment order data describing an order in which respective zones receive logical addresses;
performing the initialization of the optical disk while assigning logical addresses to one of the zones after another in accordance with the assignment order data; and
changing a logical address assignment order with respect to at least part of the zones, wherein a current assignment order data in the medium management table is rewritten in accordance with the changed logical address assignment order, the rewritten assignment order data being written to the optical disk.

11. The method according to claim 10, wherein the logical address assignment order is changed in accordance with a situation of the initialization of the optical disk.

12. The method according to claim 10, wherein the logical address assignment order is changed in accordance with an instruction from a host computer.

13. The method according to claim 10, wherein in the initialization of the optical disk, each of the zones is subjected to detection of a defective sector, and wherein the changing of the logical address assignment order is performed in accordance with a number of defective sectors found in the respective zones.

14. The method according to claim 10, wherein in the initialization of the optical disk, a number of retrials for initializing each of the zones is counted, and wherein the logical address assignment order is changed in accordance with the number of retrials with respect to the respective zones.

* * * * *